United States Patent [19]

Shenk

[11] 4,239,354

[45] Dec. 16, 1980

[54] AUTOFOCUS MOVIE CAMERA HAVING IMPROVED FOCUS RESPONSE

[75] Inventor: Edwin K. Shenk, Westford, Mass.

[73] Assignee: Polaroid Corporation, Cambridge, Mass.

[21] Appl. No.: 277

[22] Filed: Jan. 2, 1979

[51] Int. Cl.³ .......................... G03B 3/10; G05B 5/01; G05B 19/29
[52] U.S. Cl. ................................... 352/140; 354/195; 318/601; 318/611
[58] Field of Search .................. 354/25, 195; 352/140; 358/227; 355/56–59; 250/201; 318/16, 601, 611, 612, 624, 640

[56] References Cited

U.S. PATENT DOCUMENTS

| | | | |
|---|---|---|---|
| 3,370,289 | 2/1968 | Hedgcock et al. | 340/602 X |
| 3,586,953 | 6/1971 | Markkanen | 318/601 X |
| 3,760,252 | 9/1973 | Beery | 318/611 |
| 3,949,287 | 4/1976 | Wagensonner | 318/640 |
| 3,963,970 | 6/1976 | Satake | 318/640 |
| 4,002,405 | 1/1977 | Stahl | 354/195 X |
| 4,066,347 | 1/1978 | Wagensonner | 352/141 |
| 4,114,079 | 9/1978 | Miyakita | 318/601 |

OTHER PUBLICATIONS

U.S. Patent Application Serial No. 947,774.

Primary Examiner—George H. Miller, Jr.
Assistant Examiner—William B. Perkey
Attorney, Agent, or Firm—John J. Kelleher

[57] ABSTRACT

The operational range of an adjustable focus lens is subdivided into a plurality of focus zones, of finite size, by a lens control system that produces a plurality of discrete signals representative of said focus zones, said control system utilizing bidirectional drive means to position the movable element of said lens to one of said focus zones from any position within said operational range in order to focus an image of a remote object at an image plane. The present invention optimally increases the focusing of said control system while equalizing and minimizing the focusing error introduced into said control system resulting from the use of such focus zones with bidirectional drive means, by anticipating the arrival of said movable lens element at the desired focus zone and then interrupting the driving force provided by said drive means for a limited period of time prior to the time that said lens element arrives at said desired focus zone.

8 Claims, 5 Drawing Figures

AUTOFOCUS MOVIE CAMERA HAVING IMPROVED FOCUS RESPONSE

BACKGROUND OF THE INVENTION

1. Field of the Invention

The present invention relates to an automatic focusing system for an adjustable focus lens camera in general, and to such a system having reversible drive means, in particular.

2. Description of the Prior Art

Control systems for atomatically positioning the movable element of an adjustable focus lens to a desired focus position in order to properly focus an image of a remote object at the image plane of a photographic camera in response to a signal representative of the distance to said remote object, have been disclosed in the prior art. Control systems that divide the entire operational range of an adjustable focus lens into a plurality of discrete focus zones by generating a plurality of discrete signals (one discrete signal for each focus zone) in order to so focus an adjustable focus lens, have also been disclosed in the prior art.

Prior art control systems having reversible drive means are capable of automatically moving the movable element of an adjustable focus lens in either of two directions to a particular focus zone (as described above) and stoppping lens element movement as soon as said lens element reaches said focus zone. If the movable lens element is stopped as soon as it reaches an appropriate focus zone, as determined by a focus zone signal corresponding to said focus zone, said lens element can be positioned to at least two different focus positions for the same focus zone signal, the particular position being dependent upon the end of the focus zone that is entered by said movable lens element. This can result in a lens element positioning differential or focusing error as large as the width of a discrete focus zone.

One fairly common technique for reducing the aforementioned focusing error is to reduce the width of each focusing zone by increasing the total number of focusing zones that collectively represent the entire adjustable focus lens operational range. While this technique does reduce focusing error as discussed above, it does so by increasing the complexity of the automatic focus control system that positions the adjustable focus lens to the appropriate focus zone. For example, increasing the number of discrete focus zones would normally increase the total number of binary coded bits in a digital control system that would be needed to define the additional focus zones for proper automatic focus control system operation. Another technique that might be utilized to reduce focusing error is a ratchet and pawl arrangement where a pawl engages and arrests the movement of a ratchet that is mounted on and rotates with the movable element of an adjustable focus lens. While this type of arrangement would reduce focusing errors of the type described above, such an arrangement often breaks down and is relatively complex and expensive.

In my U.S. Pat. No. 4,178,087 electrodynamic braking is utilized to reduce said aforementioned focusing error by arresting lens movement within a selected portion of the desired focusing zone. While this arrangement is effective at relatively low focusing speeds, the movable lens element tends to pass through or overshoot the desired focusing zone at relatively high focusing speeds, which can result in damped oscillatory movement of said movable lens element within said desired focusing zone.

SUMMARY OF THE INVENTION

In accordance with a preferred embodiment of the present invention, a digital control system having reversible drive means for focusing the adjustable focus lens of a cine camera is capable of focusing the movable element of said adjustable focus lens to a desired focus zone, at a relatively high rate of speed, without causing said lens element to oscillate during such lens focusing. In such a control system, the entire operational range of said adjustable focus lens is divided into a plurality of discrete focus zones by generating a plurality of discrete signals, one such signal for each such focus zone. When the focus zone immediately adjacent the desired focus zone is sensed by said control system, the driving force provided by said reversible drive means is disabled for a limited period of time. If the adjustable focus lens is not focused to the desired focus zone during said limited period of time, said reversible drive means is enabled until said lens is focused to said desired focus zone.

BRIEF DESCRIPTION OF THE DRAWINGS

FIG. 3 is a perspective view of the adjustable focus lens, lens mount and reversible lens drive motor of the motion picture camera depicted in FIG. 1 showing the means for encoding the angular and therefore the focus position of the movable element of said adjustable focus lens.

FIG. 4A is a front elevational view of the lens mount for the movable element of the adjustable focus lens depicted in FIG. 3, showing a three bit binary code on a disc projecting from said lens mount, said code defining eight discrete focus zones of said adjustable focus lens.

FIG. 4B is a detailed view of three of the discrete focus zones depicted in FIG. 4A.

DESCRIPTION OF THE PREFERRED EMBODIMENTS

Figure 1:
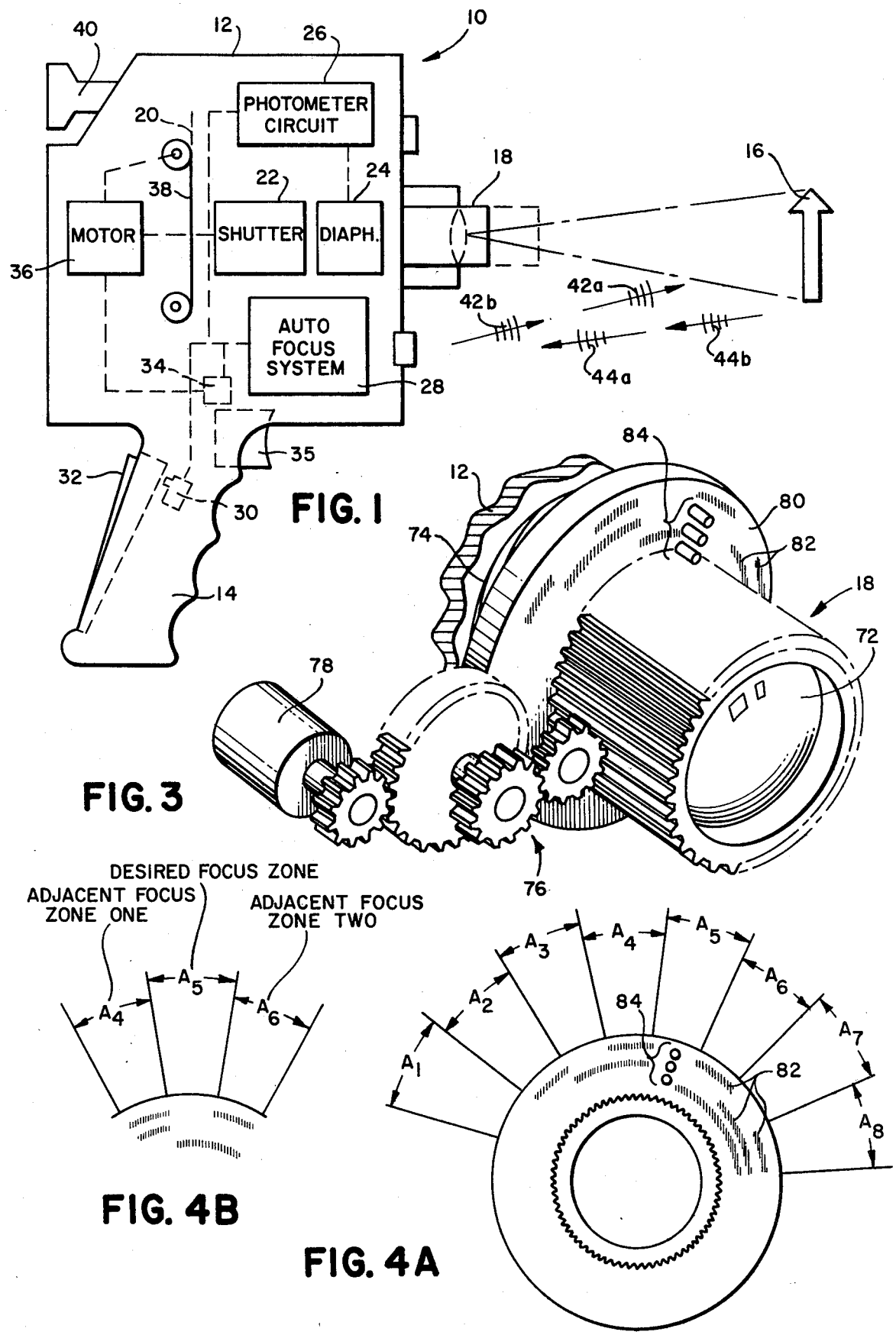
FIG. 1 is a side view, in elevation, of an adjustable focus lens motion picture camera incorporating the inventive concept of the present invention.

Referring now to the drawings and, specifically, to FIG. 1, a schematic diagram of automatic focusing camera 10 constructed in accordance with a preferred embodiment of the present invention, is depicted. Camera 10 comprises a housing 12 having handle 14 projecting from the bottom thereof by which a user holds said camera 10 to photograph subject 16 through adjustable focus lens mount 18 which directs scene light to image plane 20 when shutter mechanism 22 is operated. Diaphragm 24 associated with shutter mechanism 22, in conjunction with lens mount 18, establishes the instantaneous amount of light incident on image plane 20. The opening of diaphragm 24 is controlled by photometer circuit 26 in response to available scene light.

Mounted within said housing 12 is automatic focusing system 28 which, when activated, is responsive to the distance to subject 16 from camera 10, and to changes in said distance for adjusting the focus position of lens mount 18 in order to maintain an image of subject 16 in focus at image plane 20. Switch 30, which is mounted in camera handle 14 and is connected to an energy source (not shown), controls the operation of photometer circuit 26 and automatic focus system 28 in response to a minimum amount of pivotal movement of actuator 32 as the handle 14 is engaged by the heel of a user's hand when holding camera 10 in position to record a scene. Additionally, switch 30 couples said energy source (battery) to motor run switch 34 to permit scene recording as explained below.

Housing 12 also contains motor 36 which, when energized through motor run switch 34 by depressing trigger 35, simultaneously operates shutter 22 and a film indexing claw (not shown) which intermittently drives film 38 past an image recording station located behind shutter 22. Finally, a viewfinder 40 is provided to enable a camera user to frame the scene being filmed.

In the operation of camera 10, the user grasps handle 14 and frames subject 16 by means of viewfinder 40. As the user holds handle 14, switch 30 is closed by the movement of actuator 32 thereby powering photometer circuit 26 and automatic focus system 28. Photometer circuit 26 establishes the proper diaphragm opening in accordance with the amount of light in the scene being photographed while automatic focus system 28 ultrasonically determines the distance to subject 16 and then focuses adjustable focus lens mount 18 such that the lens system in said lens mount 18 focuses an in-focus image of subject 16 at image plane 20 when shutter 22 is activated to the open position. The distance to subject 16 is determined by measuring the time it takes for an ultrasonic burst of energy to travel from autofocus system 28 to subject 16 and to be reflected back to said autofocus system 28 from said subject 16. Reference numerals 42a and 42b designate sequential ultrasonic bursts of energy being transmitted toward subject 16 and reference numerals 44a and 44b designate the reflection of these ultrasonic bursts of energy from subject 16 toward autofocus system 28. In this particular ultrasonic focusing system, an ultrasonic burst of energy is transmitted and an echo of said transmitted burst of ultrasonic energy is received before a subsequent burst of range determining ultrasonic energy is transmitted. The ultrasonic rangefinder portion of autofocus system 28 is described in greater detail in my copending U.S. patent application Ser. No. 916,114 now U.S. Pat. No. 4,199,244.

As discussed above, autofocus system 28 determines the time interval between the transmission of an ultrasonic burst of energy 42a and the return of its echo 44a for the purpose of determining the distance to subject 16 from camera 10. Having established this distance, system 28, when permitted to do so, moves lens mount 18 toward a focus position in which an image of subject 16 will be in focus at focal plane 20 when shutter 22 is activated. As mentioned briefly above, activation of shutter 22 is selectively carried out when the user depresses trigger 35 thereby closing switch 34 and powering motor 36. Autofocus system 28 remains in operation so long as the user maintains his grasp of the handle 14, and is effective to continuously determine subject range and to cause lens mount 18 to track changes in subject distance both prior to and during filming.

Figure 2:
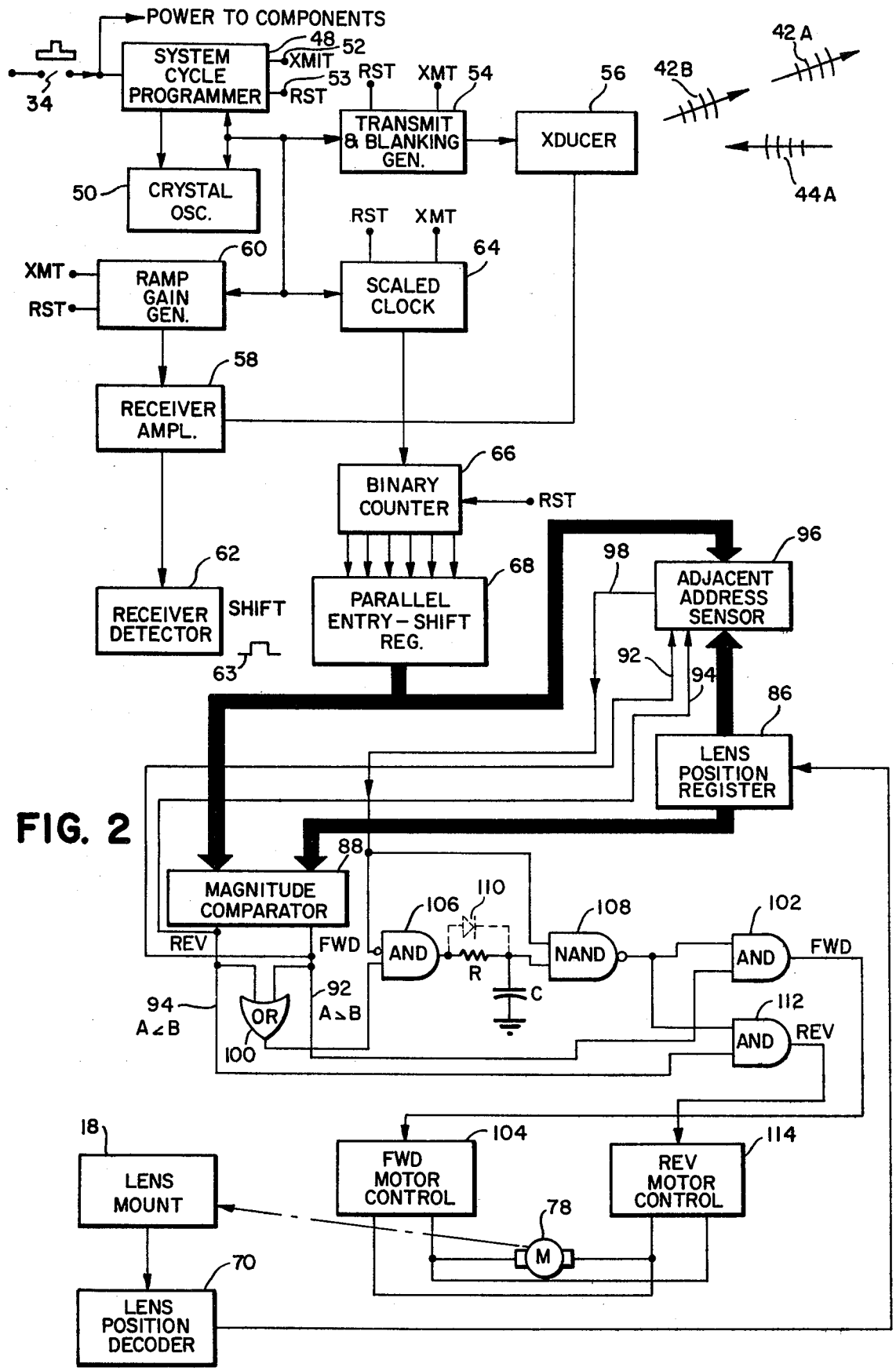
FIG. 2 is a block diagram of a preferred embodiment of the relatively high speed digital control system of the present invention.

Certain details of automatic focus system 28 are shown in FIG. 2, to which reference is now made. When switch 34 is closed, power is applied to the components of autofocus system 28 (FIG. 1) which causes system cycle programmer 48 to divide-down the high frequency output of oscillator 50 into a transmit and reset pulse train having the same pulse repetition frequency, but shifted in phase. Transmit pulses produced at output 52 are designated XMT. The reset pulses produced at output 53 and designated RST, are the same as the XMT pulses, but are delayed with respect to the XMT pulses by about 100 ms, which is greater than the round trip time for sonic energy, under normal conditions of temperature and pressure, for subjects at a distance of about 24 feet from the camera 10 (FIG. 1) which represents the hyperfocal lens position of the lens system mounted in lens mount 18 (FIG. 1). This arrangement will allow any echo from a subject within 24 feet of said camera to be received by system 28 in the time interval between successive RST reset pulses.

Transmit and blanking generator 54, to which the XMT pulses and the output of oscillator 50 are applied, operates similar to the corresponding component in the ultrasonic ranging system disclosed in copending application Ser. No. 840,802, filed Nov. 11, 1977, in the name of Juerg Muggli, now abandoned, which causes transducer 56 to transmit periodic ultrasonic bursts of energy, two of which are illustrated at 42a and 42b. An echo from a subject due to ultrasonic burst of energy 42a, indicated at 44a, is received by transducer 56 where the echo, in the form of an electrical signal, is routed to receiver amplifier 58 in the manner described in the above-mentioned MUGGLI application. Amplifier 58 has a ramp gain characteristic controlled by ramp gain generator 60 to increase the sensitivity of autofocus system 28 to distant subjects. The output of amplifier 58 is detected by receiver detector 62 to produce an echo pulse 63 such that the time between a transmit pulse and its associated echo pulse is proportional to the distance between a subject and camera 10.

This above-noted time interval is utilized in conjunction with scaled clock 64 to establish a number representative of the desired focus position for lens mount 18. The output of scaled clock 64 is a train of pulses whose pulse repetition frequency varies with time in accordance with the derivative of the lens/subject function of the lens system associated with lens mount 18. The output of scaled clock 64 is integrated by accumulating the pulses produced by said scaled clock, in binary counter 66: the contents of counter 66 at any instant in time represents the integral of the time derivative of the lens/subject function evaluated from the time of transmit pulse XMT to said instant in time. Consequently, the contents of counter 66, when echo pulse 63 occurs, is a definite integral of the time derivative of the lens/subject function of the lens system associated with lens mount 18, which is a number representing the desired focus position of said lens mount 18 for a subject whose distance is determined by the time interval between transmit pulse XMT and echo pulse 63.

By means of receiver detector 62, echo pulse 63 triggers parallel entry-shift register 68 causing the shifting of the contents of counter 66, at the instant of echo pulse 63, into shift register 68. Shortly after echo pulse 63 occurs, reset pulse RST appears at output 53 of system cycle programmer 48 thereby resetting scaled clock 64, binary counter 66, ramp gain generator 60 and transmit and blanking generator 54. The condition of autofocus system 28 is now such that upon the generation of the next ultrasonic burst of energy in response to transmit and blanking generator 54 and the next transmit pulse XMT from system cycle programmer 48, the cycle of operation described above will be repeated so that, upon the generation of the next echo pulse 63, the contents of counter 66 will again be shifted into register 68. As a consequence, the number in register 68 repeatedly varies in response to changes in subject distance at a rate dependent upon the pulse repetition rate of transmit pulse XMT.

For determining the actual position of lens mount 18, lens position decoder 70 is provided and is described in detail with respect to FIG. 3. Reference is now made to FIG. 3 which shows the preferred form of lens position decoder 70. As shown in FIG. 3, lens mount 18 carrying objective lens 72 is rotatably mounted on threaded member 74 carried by camera housing 12 so that rotational movement of lens mount 18 causes axial displacement of lens 72. Actually, the pitch of member 74 is selected such that considerably less than 360° is required to displace lens 72 from its extreme close-up axial position to its infinity or hyperfocal axial position. In order to rotate lens mount 18, a gear train 76 is interposed between the motor 78 and the gear teeth carried by the periphery of the mount of objective lens 72. A slip clutch connection (not shown) is interposed between motor 78 and lens mount 18 to permit overrunning of the motor in the event of a jam or engagement of the lens mount with an axial movement limiting stop at either end of lens mount travel. Projecting from and rotatable with the movable portion of lens mount 18 is encoder disc 80, carrying shaft encoding indicia 82 in the form of binary coded slots that pass completely through said disc 80. Encoding indicia 82 are preferably in the form of a gray code. However, for ease of description, a standard three-bit binary code is utilized. Operatively associated with indicia 82 are three photocells 84 and three light sources (not shown). The light path between a light source and its associated photocell is blocked and unblocked by slotted encoder disc 80 as said disc is rotated through said light path. The output of each photocell provides one bit of information on the angular and therefore the axial position of the movable element of lens mount 18. The slots in disc 80 and their relationship to photocells 84 are shown in greater detail in FIG. 4A.

FIG. 4A is a front elevational view of the movable element in lens mount 18 of the adjustable focus lens depicted in FIG. 3, showing a three-bit binary code on encoder disc 80 projecting from said lens mount, said code defining eight address locations or discrete focus zones of said adjustable focus lens. The eight focus zones are designated $A_1$ thru $A_8$, said focus zones corresponding to the numbers 0 through 7, respectively, in binary code. The $A_1$ thru $A_8$ focus zones are shown extending over 160° of movable lens element rotation. However, this range of angular movement is by design choice and said movement range could extend to 360° or substantially less than the 160° shown.

Turning again to FIG. 2, the output of lens position decoder 70 is applied to lens position register 86 which constitutes means responsive to the position of said lens mount 18 for generating a number representative of the actual position of said lens mount. Continuing now with the operation of the embodiment of FIG. 2, parallel entry/shift register 68 is a first register of autofocus system 28 (FIG. 1) and stores a number representative of the desired focus position for lens mount 18, the contents of this first register varying in response to changes in subject distance at a rate dependent on the pulse repetition rate of the transmit pulses as previously discussed. Lens position register 86 constitutes a second register of autofocus system 28 (FIG. 1) which stores a number representative of the actual position of lens mount 18, the contents of register 86 varying in response to changes in lens mount 18 position at a rate determined by the rate of change of lens mount 18 position. The rate of change of the contents of register 86 is thus independent of the rate at which the contents of register 68 are updated.

The contents of registers 68 and 86 are compared in magnitude comparator 88 to determine, on a continuous basis, which register contains the larger number. Since each register number is based on the same reference (i.e., the desired focus position and the actual lens position are measured from the same reference point), the contents of the registers will be equal when the actual position of lens mount 18 corresponds to the desired focus position for said lens mount 18. When the contents of one register exceeds the other, the actual position of lens mount 18 will be displaced from its last focus position by an amount equal to the difference between the contents of each such register. Whether the actual position of lens mount 18 is on one side or the other of the desired focus position will depend upon which register contains the larger number.

Comparator 88 has forward and reverse output terminals 92 and 94, respectively. A signal appears on forward terminal 92 only when the number in first register 68 exceeds the number in second register 86. If the numbers in the registers are designated A and B, then a signal will appear on terminal 92 when $A > B$. Ordinarily, a signal will appear on second terminal 94 only when the reverse relationship between the magnitudes occurs, namely $B > A$.

In a manner similar to magnitude comparator 88, the contents of registers 68 and 86 are compared in adjacent address sensor 96, on a continuous basis, to determine when a focus zone immediately adjacent the desired focus zone has been sensed by photocells 84 (FIGS. 1 and 3). Forward and reverse signals 92 and 94 from the output of magnitude comparator 88 enable adjacent address sensor 96 to determine which of two possible focus zones adjacent a desired focus zone is being sensed by photocells 84. For example, in FIG. 4B, which is a detailed view of three of the focus zones depicted in FIG. 4A, if focus zone $A_5$ was the desired focus zone, focus zones $A_4$ and $A_6$ are two focus zones that are immediately adjacent said focus zone $A_5$ and for proper implementation of the inventive concept of the present invention, adjacent address sensor 96 must know which of the two possible adjacent focus zones is the actual adjacent focus zone and this particular information is provided by forward and reverse drive signals 92 and 94 appearing at the output of magnitude comparator 88. Adjacent address signal 98 appears at the output of adjacent address sensor 96 when photocells 84 sense the proper focus zone adjacent a desired focus zone.

In operation, focus forward signal 92 appearing at the output of magnitude comparator 88 will appear at the input to OR gate 100 and at the input to AND gate 102. If adjacent address sensor 96 does not produce adjacent address signal 98 at its output, AND gate 102 will be satisfied and a drive forward signal will be sent to forward motor control 104 which will cause lens drive motor 78 and lens mount 18 to be driven in the forward direction toward a desired focus zone. In addition to satisfying gate 102, focus forward signal 92 also satisfies OR gate 100 and the output of said OR gate 100 satisfies AND gate 106. When AND gate 106 is satisfied, timing capacitor C charges up to the output voltage of AND gate 106, thereby providing one of the two inputs to NAND gate 108. When adjacent address sensor 96 senses the adjacent focus zone and produces adjacent address signal 98 at its output, said signal appears at the input to NAND gate 108 causing said NAND gate 108 to open, which causes AND gate 102 to open, which terminates the drive forward signal to forward motor control 104 and the driving force being supplied by motor 78, but allowing inertial forces to continue to move lens mount 18 toward the desired focus zone. When adjacent address signal 98 appears at the input of NAND gate 108 and causes said NAND gate 108 to open, said signal 98 also appears at the input to AND gate 106, causing said AND gate 106 to open also. When AND gate 106 opens, the voltage at its output falls, causing the voltage on capacitor C to fall. If lens mount 18 does not reach the desired focus zone within a predetermined interval of time the voltage on capacitor C falls below the threshold of NAND gate 108 and NAND gate 108 will again have a signal at its output that will satisfy AND gate 102 and cause forward motor control 104 to energize motor 78, causing said motor 78 to drive lens mount 18 until magnitude comparator 88 determines that the desired focus zone has been reached. Once the desired focus zone is reached, focus forward signal 92 is disabled, which opens AND gate 102 and again terminates the motor force being supplied by drive motor 78. The predetermined interval of time is determined by capacitor C, resistor R and reset diode 110. Diode 110 serves to charge capacitor C rapidly so that it is ready for its next discharge cycle at an earlier point in time.

Similarly, focus reverse signal 94 appearing at the output of magnitude comparator 88 will appear at the input to OR gate 100 and at the input to AND gate 112. If adjacent address sensor 96 does not produce adjacent address signal 98 at its output, AND gate 112 will be satisfied and a drive reverse signal will be sent to reverse motor control 114, which will cause lens drive motor 78 and lens mount 18 to be driven in the reverse direction toward a desired focus zone. In addition to satisfying gate 112, focus reverse signal 94 also satisfies OR gate 100 as well as AND gate 106. When AND gate 106 is satisfied, timing capacitor C charges up to the output voltage of AND gate 106, thereby providing one of the two inputs to NAND gate 108. When adjacent address sensor signal 96 senses the adjacent focus zone and produces adjacent address signal 98 at its output, said signal appears at the input to NAND gate 108, causing said NAND gate 108 to open, which causes AND gate 102 to open, which terminates the drive reverse signal to reverse motor control 114 and the driving force being supplied by motor 78, but allowing inertial forces to continue to move lens mount 18 toward the desired focus zone. When adjacent address signal 98 appears at the input of NAND gate 108 and causes said NAND gate 108 to open, said signal 98 also appears at the input to AND gate 106, causing said AND gate 106 to open also. When AND gate 106 opens, the voltage at its output falls, causing the voltage on capacitor C to fall. If lens mount 18 does not reach the desired focus zone within a predetermined interval of time the voltage on capacitor C falls below the threshold of NAND gate 108 and NAND gate 108 will again have a signal at its output that will satisfy AND gate 112 and cause reverse motor control 114 to energize motor 78, causing said motor 78 to drive lens mount 18 until magnitude comparator 88 determines that the desired focus zone has been reached. Once the desired focus zone is reached, focus reverse signal 94 is disabled, which opens AND gate 112 and again terminates the motor force being supplied by drive motor 78. By anticipating the arrival of the adjustable focus lens at the desired focus zone, de-energizing the motor drive before the desired focus zone is reached and then re-energizing the motor drive if the desired focus zone is not reached within a predetermined time interval, the focus control system can focus the adjustable focus lens at a relatively high rate of speed without causing said lens to overshoot the desired focus zone.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. In an autofocusing camera having a displaceable lens,
    means for determining subject distance,
    control means energizeable for displacing said lens to a location selected in accordance with said distance determining means to thereby focus an image of the subject on the camera focal plane,
    said control means including encoder means responsive to lens displacement for producing a plurality of discrete signals, each representative of displacement of said lens to within a respective positional zone of said lens,
    and said control means including means for terminating displacement of said lens within a positional zone selected in accordance with said distance determining means, the improvement comprising:
    that said displacement terminating means includes,
    means for generating a signal representative of said lens at a positional zone immediately adjacent said selected positional zone; and
    means responsive to said adjacent positional zone signal for de-energizing said lens displacing control means for a predetermined period of time and for reenergizing said lens displacing control means if said displaceable lens is not positioned to within said selected positional zone within said predetermined period of time.

2. The apparatus of claim 1, wherein said adjacent zone signal generating means includes means for determining the adjacent positional zone immediately before said selected positional zone.

3. The apparatus of claim 1, wherein the means for establishing said predetermined period of time includes a resistor and capacitor voltage integrating network.

4. The apparatus of claim 1, wherein said control means includes a reversible drive motor.

5. In a photographic camera of the type having,
    means for selectively coupling said camera to a source of energy
    an image plane,
    an adjustable focus lens mounted for displacement over a given operational range where it serves to focus images of subjects positioned within a range of subject distances at said image plane,
    means for producing a signal indicative of the position of a particular subject within said range of subject distances,
    means for producing a plurality of discrete focus zone signals that correspond to a plurality of focus zones, said focus zones collectively representing the entire focusing range of said adjustable focus lens, drive means for effecting movement of said lens from either of two directions to a particular focus zone to focus an image of a particular subject at said image plane;

the improvement comprising:

means for generating a signal representative of said lens at the adjacent focus zone immediately before said particular focus zone; and means responsive to said adjacent zone signal for deenergizing said lens moving drive means for a predetermined period of time and for reenergizing said drive means if said displaceable lens is not positioned to within said particular focus zone within said predetermined period of time.

6. The apparatus of claim 5, wherein said adjacent zone signal generating means includes means for determining the adjacent positional zone immediately before said particular positional zone.

7. The apparatus of claim 5, wherein the means for establishing said predetermined period of time includes a resistor and capacitor voltage integrating network.

8. The apparatus of claim 5, wherein said drive means includes a reversible drive motor.

* * * * *